US011001709B2

(12) United States Patent
Hein et al.

(10) Patent No.: US 11,001,709 B2
(45) Date of Patent: May 11, 2021

(54) POLYCARBONATE COPOLYMERS, ARTICLES FORMED THEREFROM, AND METHODS OF MANUFACTURE

(71) Applicant: SABIC GLOBAL TECHNOLOGIES B.V., Bergen op Zoom (NL)

(72) Inventors: Christopher Luke Hein, Evansville, IN (US); Rahul Patil, Evansville, IN (US); Bing Zhou, Evansville, IN (US); Guangxin Lin, Mount Vernon, IN (US); Chelsea Schmidt, Wadesville, IN (US); David Zoller, Evansville, IN (US); Shuailei Ma, Evansville, IN (US); Chester Hassman, Newburgh, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/479,787

(22) PCT Filed: May 5, 2017

(86) PCT No.: PCT/US2017/031280
§ 371 (c)(1),
(2) Date: Jul. 22, 2019

(87) PCT Pub. No.: WO2018/164706
PCT Pub. Date: Sep. 13, 2018

(65) Prior Publication Data
US 2020/0385569 A1 Dec. 10, 2020

Related U.S. Application Data

(60) Provisional application No. 62/469,693, filed on Mar. 10, 2017.

(51) Int. Cl.
| | | |
|---|---|---|
| C08L 69/00 | (2006.01) |
| C08G 63/64 | (2006.01) |
| C08G 77/448 | (2006.01) |
| C08K 5/053 | (2006.01) |
| C08K 5/08 | (2006.01) |
| C08K 5/09 | (2006.01) |
| C08K 5/13 | (2006.01) |
| C08L 83/10 | (2006.01) |

(52) U.S. Cl.
CPC ............ *C08L 69/00* (2013.01); *C08G 63/64* (2013.01); *C08G 77/448* (2013.01); *C08K 5/053* (2013.01); *C08K 5/08* (2013.01); *C08K 5/09* (2013.01); *C08K 5/13* (2013.01); *C08L 83/10* (2013.01); *C08G 2120/00* (2013.01); *C08L 2203/30* (2013.01)

(58) Field of Classification Search
USPC ................................. 528/196, 198
See application file for complete search history.

(56) References Cited

U.S. PATENT DOCUMENTS

| | | |
|---|---|---|
| 4,308,406 A | 12/1981 | Takenaka et al. |
| 4,600,647 A | 7/1986 | Robeson et al. |
| 6,410,620 B2 | 6/2002 | Shakhnovich |
| 6,414,058 B2 | 7/2002 | Shakhnovich |
| 6,583,256 B2 | 6/2003 | Vollenberg et al. |
| 6,861,482 B2 | 3/2005 | Brunelle et al. |
| 7,169,859 B2 | 1/2007 | Davis et al. |
| 7,321,014 B2 | 1/2008 | Glasgow et al. |
| RE40,508 E | 9/2008 | Brunelle et al. |
| 7,605,221 B2 | 10/2009 | Davis et al. |
| 7,695,815 B2 | 4/2010 | Argawal et al. |
| 7,709,581 B2 | 5/2010 | Glasgow et al. |
| 7,790,292 B2 | 9/2010 | Colborn et al. |
| 7,838,602 B2 | 11/2010 | Davis et al. |
| 8,969,447 B2 | 3/2015 | Van Der Mee et al. |
| 9,650,496 B2 | 5/2017 | Van Der Mee et al. |
| 9,982,130 B2 | 5/2018 | Sybert et al. |
| 2006/0116487 A1 | 6/2006 | Brunelle et al. |
| 2007/0027271 A1 | 2/2007 | Davis et al. |
| 2007/0100088 A1 | 5/2007 | Gallucci et al. |
| 2007/0155913 A1 | 7/2007 | Chakravarti et al. |
| 2007/0155946 A1 | 7/2007 | Berti et al. |
| 2008/0119597 A1 | 5/2008 | Chakravarti et al. |
| 2014/0326163 A1 | 11/2014 | Van Der Mee et al. |
| 2014/0370213 A1 | 12/2014 | Van Der Mee et al. |
| 2017/0306147 A1 | 10/2017 | Sharma et al. |
| 2017/0355832 A1 | 12/2017 | Sybert et al. |

FOREIGN PATENT DOCUMENTS

| | | |
|---|---|---|
| EP | 0524731 A1 | 1/1993 |
| EP | 2634219 A1 | 9/2013 |
| GB | 1515585 A | 6/1978 |
| JP | 2003082201 A | 3/2003 |
| WO | 0015718 A1 | 3/2000 |
| WO | 0119921 A1 | 3/2001 |
| WO | 2005021616 A1 | 3/2005 |
| WO | 2014201086 A2 | 12/2014 |
| WO | 2015153483 A1 | 10/2015 |
| WO | 2016085790 A1 | 6/2016 |
| WO | 2016085928 A1 | 6/2016 |

OTHER PUBLICATIONS

International Search Report for International Application No. PCT/US2017/031280, International Filing Date May 5, 2017, dated Nov. 3, 2017, 5 pages.
Written Opinion for International Application No. PCT/US2017/031280, International Filing Date May 5, 2017, dated Nov. 3, 2017, 6 pages.
Harper et al.; "Plastics Materials and Processes: A Concise Encyclopedia"; 2003, p. 415.

*Primary Examiner* — Terressa Boykin
(74) *Attorney, Agent, or Firm* — Cantor Colburn LLP

(57) ABSTRACT

A polycarbonate copolymer contains aromatic carbonate units; optionally siloxane units; and resorcinol arylate ester units. The resorcinol arylate ester units of the polycarbonate copolymer are derived from a resorcinol composition having a hydroquinone content of 50 to 1200 parts per million, a catechol content of 5 to 29 parts per million, and a phenol content of 0 to 2400, each as determined by high performance liquid chromatography, and further comprising an acid stabilizer.

21 Claims, 3 Drawing Sheets

POLYCARBONATE COPOLYMERS, ARTICLES FORMED THEREFROM, AND METHODS OF MANUFACTURE

CROSS REFERENCE TO RELATED APPLICATIONS

This application is a National Stage application of PCT/US2017/031280, filed May 5, 2017, which claims the benefit of U.S. Provisional Application No. 62/469,693, filed Mar. 10, 2017, both of which are incorporated by reference in their entirety herein.

BACKGROUND

This disclosure generally relates to polycarbonate copolymers, and more particularly, to poly(carbonate-arylate)s and poly(carbonate-siloxane-arylate)s, methods of manufacture, and uses thereof.

Polycarbonates are useful in the manufacture of articles and components for a wide range of applications, from automotive parts to electronic appliances at least in part because of their good balance of properties, such as moldability, heat resistance and impact properties, among others. The properties of polycarbonates may be further adjusted by the inclusion of discrete, compositionally different polymer units. For example, copolymers comprising ester, carbonate, and optionally siloxane units can exhibit additional advantageous properties in toughness, weatherability, and flame retardance.

Polycarbonate copolymers can be manufactured by different methods such as solution polymerization, interfacial polymerization, and melt polymerization. Currently the synthesis of the polycarbonate copolymers is based on using monomers having a very low impurity profile because it is believed that impurities in the monomers may have detrimental effects to the properties of the copolymers. Reliance on monomers having extremely low impurity presents challenges in terms of material supply and cost. There accordingly remains a need for processes of making polycarbonate copolymers from monomers having a less stringent purity profile. It would be a further advantage if the polycarbonate copolymers derived from less pure monomers could have comparable or even improved properties as compared to the polycarbonate copolymers derived from monomers having a higher purity.

SUMMARY

In an embodiment, a polycarbonate copolymer comprises aromatic carbonate units; optionally siloxane units; and resorcinol arylate ester units derived from a resorcinol composition having a hydroquinone content of 50 to 1200 parts per million, a catechol content of 5 to 29 parts per million, and a phenol content of 0 to 2400, each as determined by high performance liquid chromatography, and further comprising an acid stabilizer.

A method of manufacturing the polycarbonate copolymer comprises reacting a combination comprising a dicarboxylic acid dihalide, optionally a dihydroxy siloxane, and a resorcinol composition having a hydroquinone content of 5 to 1200 parts per million, a catechol content of 5 to 29 parts per million, a phenol content of 0 to 2400, each as determined by high performance liquid chromatography, and further comprising an acid stabilizer, to provide an arylate-resorcinol-arylate polymer; and reacting the arylate-resorcinol-arylate polymer with a bisphenol and a carbonate precursor to provide the polycarbonate copolymer. A polycarbonate copolymer formed by the method is also disclosed.

In another embodiment, a thermoplastic composition comprises the above-described polycarbonate copolymer.

In still another embodiment, an article comprises the above-described thermoplastic composition. The article is a molded article, a fiber, a thermoformed article, an extruded film, an extruded sheet, one or more layers of a multi-layer article, a substrate for a coated article, or a substrate for a metallized article.

The above described and other features are exemplified by the following drawings, detailed description, examples, and claims.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
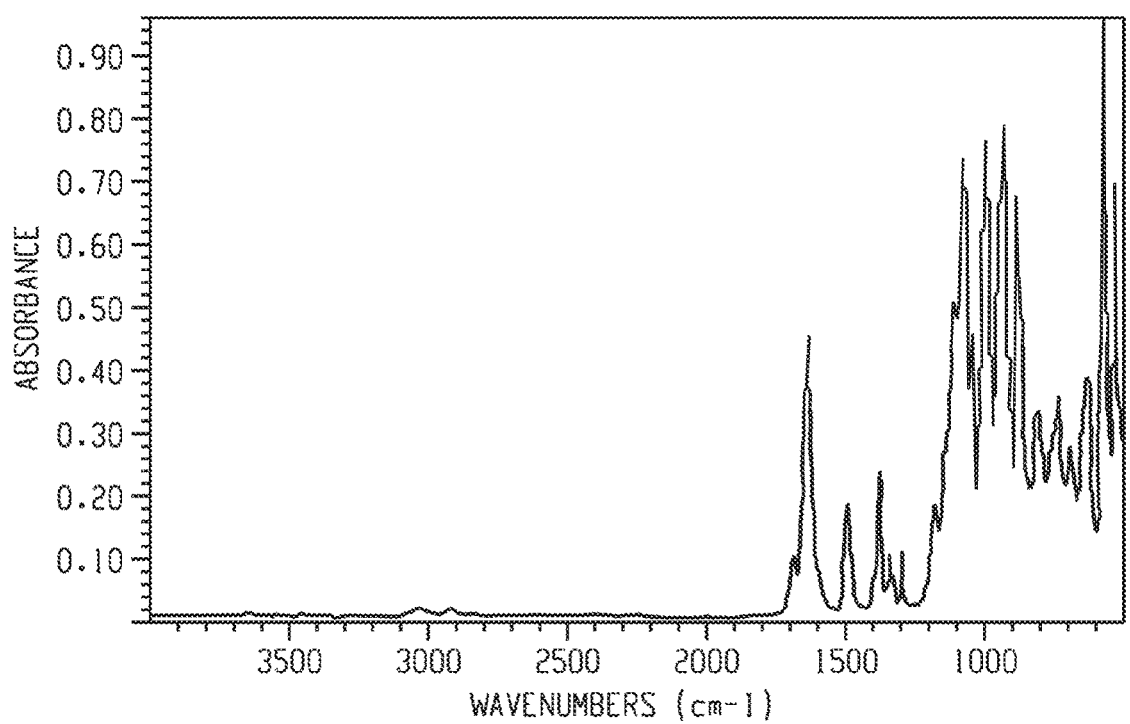
FIG. 1 is a Fourier transform infrared spectrum of the product of Comparative Example 2.

It has now been discovered that the polycarbonate copolymers having desirable properties can be derived from a resorcinol composition containing certain level of impurities. In particular, polycarbonate copolymers such as poly(carbonate-siloxane-arylate)s derived from a resorcinol composition containing certain levels of impurities can have increased ester content and decreased carbonate carbonyl to ester carbonyl ratio as compared to polycarbonate copolymers derived from a resorcinol composition containing less impurities. In a further advantageous feature, the polycarbonate copolymers derived from a resorcinol composition containing certain levels of impurities can have improved glass transition temperature, lower auto-fluorescence, and a lower yellowness index as compared to polycarbonate copolymers derived from a resorcinol composition containing fewer impurities.

As used herein, the polycarbonate copolymers comprise repeating aromatic carbonate units, resorcinol arylate ester units, and optionally aromatic siloxane units, where the resorcinol arylate ester units are derived from a resorcinol composition having a hydroquinone content of 50 to 1200 parts per million, a catechol content of 5 to 29 parts per million, and a phenol content of 0 to 2400, each as determined by high performance liquid chromatography, and an acid stabilizer. Optionally the resorcinol composition has a purity of 99 wt % to 99.8 wt. %, or 98 wt. % to 99.8 wt. %, or 97 to 99.8 wt. %, each as determined by high performance liquid chromatography.

The acid stabilizer can be inorganic or organic. Exemplary inorganic acid stabilizers include mineral acids such as hydrochloric acid, phosphoric acid, phosphorous acid, and the like. Organic acid stabilizers are preferred in some embodiments. The organic acid stabilizer can be used in the form of an acid or an acid derivative, for example in the form of a lactone or a $C_{1-6}$, preferably a $C_{1-3}$ alkyl ester. When in the acid form, the organic acid stabilizer can have at least a first pKa from 2.5 to 4.5. Exemplary organic acid stabilizers include a $C_{1-12}$, preferably a $C_{2-12}$, more preferably a $C_{4-12}$ carboxylic acid, or a derivative thereof (i.e., the lactone or alkyl ester thereof). In an embodiment, the organic acid stabilizer is a $C_{1-12}$, preferably a $C_{2-12}$, more preferably a $C_{4-12}$ compound that is a hydroxy-substituted carboxylic acid, a lactone, a hydroxy-substituted lactone, a polycarboxylic acid, a hydroxy-substituted polycarboxylic acid, or a combination comprising at least one of the foregoing. The corresponding derivatives of these compounds can also be used. Specific examples of the organic acid stabilizers include oxalic acid, malic acid, citric acid, ascorbic acid, 2,3,4,5,6-pentahydroxyhexanoic acids such as gluconic acid, 2,3,4,5-tetrahydroxypentaanoic acids, acids maleic acid, fumaric acid, lactic acid, formic acid, tartaric acid, tartronic acid, or the corresponding lactone or alkyl ester of any of the foregoing, or a combination comprising at least one of the foregoing.

As a further advantageous feature, when the resorcinol composition is stabilized with gluconic acid, the polycarbonate copolymer derived therefrom can have a further improved yellowness index as compared to a polycarbonate copolymer derived from an otherwise same resorcinol composition except for being stabilized with citric acid. A copolymer derived from a resorcinol composition stabilized with gluconic acid can also have a higher glass transition temperature than the copolymers derived from an otherwise same resorcinol composition except for being stabilized with citric acid. It is also discovered that the chain architecture of the copolymers can be adjusted by adjusting the stabilizer used in the resorcinol composition. A copolymer prepared from a resorcinol composition stabilized with gluconic acid can have a higher ITR blocks content, a lower arylate-resorcinol-carbonate content, and a lower carbonate-resorcinol-carbonate content, each on a percent basis compared to the copolymers prepared from an otherwise same resorcinol composition except for being stabilized with citric acid, as determined by $^{13}C$ NMR.

The amount of the acid stabilizer can vary depending on the particular acid used and the resorcinol formulation. In an embodiment, the acid stabilizer is present in an amount of 1 to 5000 parts per million (ppm) by weight based on the parts by weight of resorcinol. In some embodiments the acid stabilizer is present in an amount of 10 to 5000 ppm, or 100 to 5000 ppm, or 100 to 2500 ppm, or 100 to 2000 ppm. Inorganic acids can be used in relatively lower amounts (e.g., 1 to 500 ppm), whereas organic acids can be used in relatively larger amounts (e.g., 500 to 5000 ppm).

Preferably, the resorcinol composition has a hydroquinone content of 50 to 500 parts per million, or 60 to 200 parts per million, or 100 to 150 parts per million, a catechol content of 10 to 30 parts per million, or 10 to 25 parts per million, or 15 to 25 parts per million, and a phenol content of 50 to 2400 parts per million, or 800 to 2400 parts per million, or 1000 to 2000 parts per million, each as determined by high performance liquid chromatography. In another embodiment, the resorcinol composition has a hydroquinone content of 400 to 1200 parts per million, a catechol content of 4 to 11 parts per million, and a phenol content of 0 parts per million, each as determined by high performance liquid chromatography.

The resorcinol arylate ester units in the polycarbonate copolymers are repeating units of formula (4)

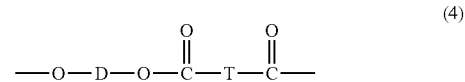

(4)

wherein D is a divalent group derived from a resorcinol-based monomer of formula (5); and T is a divalent $C_{6-20}$ arylene group

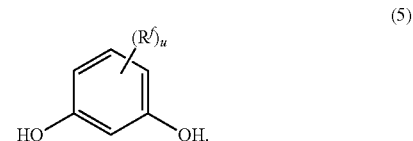

(5)

In formula (5), each $R^f$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and u is 0 to 4. Optionally, D also includes a divalent group derived from a bisphenol of formula (3) as described herein such as bisphenol A. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents. In an embodiment, D does not have any substitution and is derived from a monomer of formula (5) where u is zero.

Examples of aromatic dicarboxylic acids from which the T group in the ester unit of formula (4) is derived include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

Derivatives of the dicarboxylic acids such as dicarboxylic acid dichloride can also be used. A specific dicarboxylic acid dichloride comprises a combination of isophthalic acid dichloride and terephthalic acid dichloride. In such an embodiment, the arylate units are of formula (6)

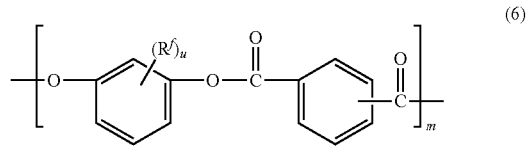

(6)

wherein each $R^f$ and u are as defined in formula (5), and m is greater than or equal to 4. In an embodiment, m is 4 to 100, 4 to 50, specifically 5 to 30, more specifically 5 to 25, and still more specifically 10 to 20. The molar ratio of isophthalate to terephthalate can be 80:20 to 20:80, 70:30 to 30:70, or 60:40 to 40:60.

Exemplary resorcinol arylate ester units are isophthalate-terephthalate-resorcinol ester units, isophthalate-terephthalate-bisphenol ester units, or a combination comprising each of these, which can be referred to respectively as poly (isophthalate-terephthalate-resorcinol) ester units, poly (isophthalate-terephthalate-bisphenol-A) ester units, and poly[(isophthalate-terephthalate-resorcinol) ester-co-(isophthalate-terephthalate-bisphenol-A)] ester units.

The aromatic carbonate units of the polycarbonate copolymers are repeating units of formula (1)

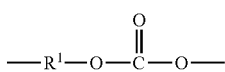

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

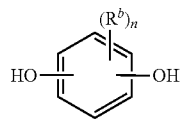

(2)

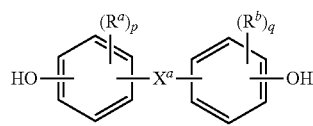

(3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), W and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and W and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis (4-hydroxyphenyl) propane ("bisphenol A" or "BPA", in which in which each of $A^1$ and $A^2$ is p-phenylene and $Y^1$ is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane (DMBPC), and from bisphenol A and 1,1-bis (4-hydroxy-3-methylphenyl)-3,3,5-trimethylcyclohexane (isophorone bisphenol).

In an embodiment, the polycarbonate units are present as linear units derived from bisphenol A. The polycarbonate units can also include resorcinol carbonate units derived from resorcinol.

In some embodiments, the carbonate units and the ester units are present as blocks of formula (7)

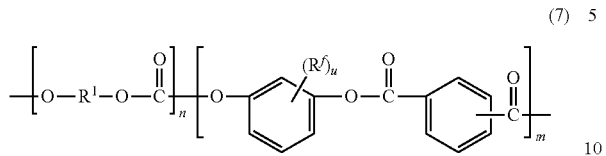

(7)

wherein $R^f$, u, and m are as defined in formula (5), each $R^1$ is independently a $C_{6-30}$ arylene group, and n is greater than or equal to one, for example 3 to 50, specifically from 5 to 25, and more specifically from 5 to 20. In an embodiment, m is 5 to 75 and n is 3 to 50, or m is 10 to 25 and n is 5 to 20, and the molar ratio of isophthalate units to terephthalate units is 80:20 to 20:80, 70:30 to 30:70, or 60:40 to 40:60. In the foregoing embodiment, the preferred carbonate units are bisphenol A carbonate units, optionally together with resorcinol carbonate units, and the arylate units are poly(isophthalate-terephthalate-resorcinol) ester units, poly(isophthalate-terephthalate-bisphenol-A) ester units, and poly[(isophthalate-terephthalate-resorcinol) ester-co-(isophthalate-terephthalate-bisphenol-A)] ester units. In a specific embodiment, the carbonate and arylate units are present as a poly(isophthalate-terephthalate-resorcinol ester)-co-(resorcinol carbonate)-co-(bisphenol-A carbonate) segment.

The carbonate and arylate segments desirably comprise a minimum amount of saturated hydrocarbon present in the form of substituents or structural groups such as bridging groups or other connective groups. In an embodiment, less than or equal to 25 mol %, specifically less than or equal to 15 mol %, and still more specifically less than or equal to 10 mol % of the combined arylate units and carbonate units comprise alkyl, alkoxy, or alkylene groups. In another embodiment, the arylate ester units and the carbonate units are not substituted with non-aromatic hydrocarbon-containing substituents such as alkyl, alkoxy, or alkylene substituents.

A specific polycarbonate copolymer is a poly(carbonate)-co-(monoaryl arylate ester) such as a poly(bisphenol A carbonate)-co-(isophthalate-terephthalate-resorcinol ester) of formula (7c)

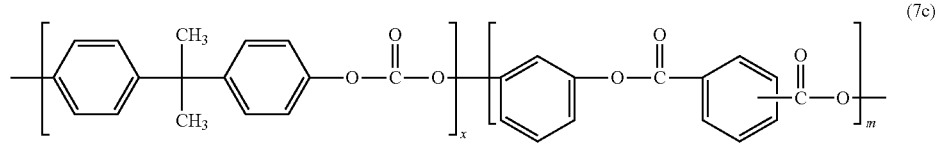

(7c)

wherein m is 4 to 100, 4 to 90, 5 to 70, more specifically 5 to 50, or still more specifically 10 to 30, and the mole ratio of x:m is 99:1 to 1:99, specifically 90:10 to 10:90. The isophthalate-terephthalate-resorcinol ("ITR") ester units are present in the poly(carbonate-arylate ester) copolymer in an amount greater than or equal to 95 mol %, specifically greater than or equal to 99 mol %, and still more specifically greater than or equal to 99.5 mol % based on the total moles of ester units. Other carbonate units, other ester units, or a combination thereof can be present, in a total amount of 1 to 20 mole % based on the total moles of units in the copolymers, for example resorcinol carbonate units of formula (20) and bisphenol ester units of formula (7a):

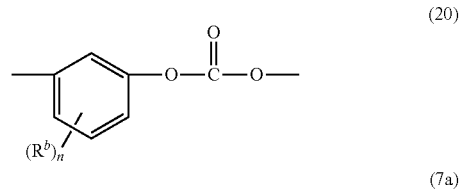

(20)

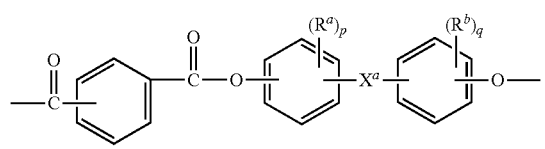

(7a)

wherein, in the foregoing formulae, $R^h$ is each independently a $C_{1-10}$ hydrocarbon group, n is 0 to 4, W and $R^h$ are each independently a $C_{1-12}$ alkyl, p and q are each independently integers of 0 to 4, and $X^a$ is a single bond, —O—, —S—, —S(O)—, —S(O)_2—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein W is a divalent $C_{1-12}$ hydrocarbon group. The bisphenol ester units can be bisphenol A phthalate ester units of the formula

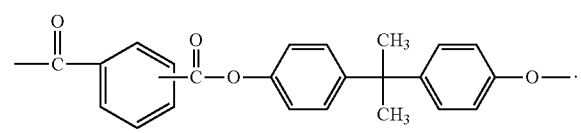

In an embodiment, poly(bisphenol A carbonate)-co-(isophthalate-terephthalate-resorcinol ester) (7c) comprises 1 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof. A specific poly(ester-carbonate) comprises resorcinol isophthalate and terephthalate units and bisphenol A carbonate units, such as those commercially available under the trade name LEXAN SLX from SABIC.

Another specific polycarbonate copolymer is a poly(carbonate-siloxane-arylate). In addition to aromatic carbonate units and resorcinol arylate ester units as described herein, poly(carbonate-siloxane-arylate)s also contain siloxane units. The siloxane units are present as polydiorganosiloxane (also referred to herein as "polysiloxane") blocks, which comprise repeating diorganosiloxane ("siloxane") units as in formula (8)

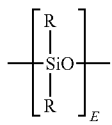
(8)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (8) can vary widely depending on the type and relative amount of each component in the copolymer and composition containing the copolymer, the desired properties of the composition, and like considerations. Generally, E has an average value of 2 to 1,000, specifically 2 to 500, 2 to 200, or 2 to 125, 5 to 80, or 10 to 70, or 2 to 30 or 2 to 15, or 5 to 15. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

In an embodiment, the siloxane units are of formula (9)

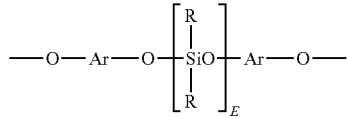
(9)

wherein E is as defined in formula (8); each R can be the same or different, and is as defined above;

and Ar can be the same or different, and is a substituted or unsubstituted $C_6$-$C_{30}$ arylene, wherein the bonds are directly connected to an aromatic moiety. The Ar groups in formula (9) can be derived from a $C_6$-$C_{30}$ dihydroxyarylene compound, for example a dihydroxyarylene compound of formula (2) or formula (3). Specific dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the Ar group is derived from resorcinol, bisphenol A, or a combination thereof, preferably the Ar group is derived from resorcinol. Units of formula (9) can be derived from the corresponding dihydroxy aromatic compound as is known in the art.

In another embodiment, polydiorganosiloxane units are of formula (10)

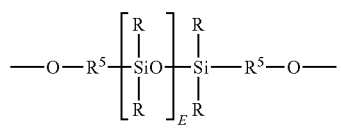
(10)

wherein R and E are as described in formula (8), and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane units are of formula (11):

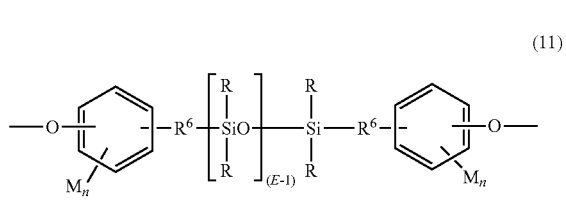
(11)

wherein R and E are as defined above. $R^6$ in formula (11) is a divalent $C_2$-$C_8$ aliphatic. Each M in formula (11) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, $R^6$ is a divalent $C_1$-$C_3$ aliphatic group. Specific siloxane blocks are of the formula

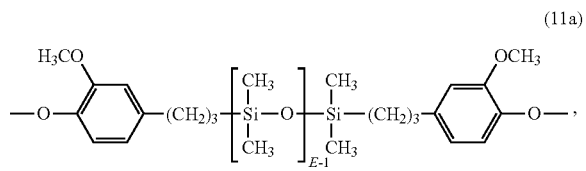
(11a)

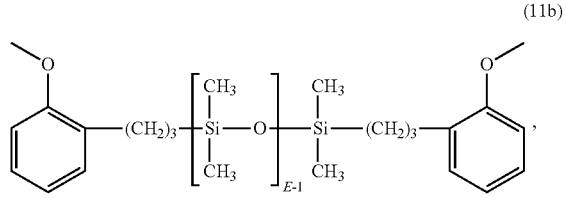
(11b)

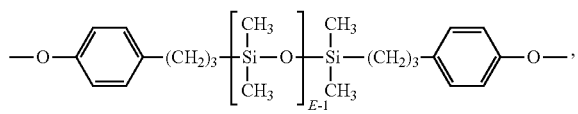
(11c)

or a combination comprising at least one of the foregoing, wherein E has an average value of 2 to 200, 2 to 125, 5 to 125, 5 to 100, 5 to 50, 20 to 80, or 5 to 20, or 2 to 30, or 5 to 15. Units of formula (11) can be derived from the corresponding dihydroxy polydiorganosiloxane as is known in the art.

The dihydroxy polydiorganosiloxane of formula (11a) in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The polysiloxane units can also be endcapped, with resorcinol or bisphenol A, for example, by the synthetic procedures of European Patent Application Publication No. 0 524 731 A1 of Hoover. The endcapped polysiloxane can form an ester-linked structure with a carboxylic acid derivative during formation of the poly(carbonate-siloxane-arylate), or a carbonate-linked structure by copolymerization with a carbonate precursor such as chloroformate, or a combination of such structures.

The poly(carbonate-siloxane-arylate) comprises siloxane units in an amount of 0.5 to 20 mol %, specifically 1 to 10 mol % siloxane units, based on the combined mole percentages of siloxane units, arylate ester units, and carbonate units, and provided that siloxane units are provided by polysiloxane units covalently bonded in the polymer backbone of the poly(carbonate-siloxane-arylate).

In an embodiment, the poly(carbonate-siloxane-arylate) comprises siloxane units in an amount of 0.1 to 25 weight percent (wt %) or 0.2 to 10 wt %, specifically 0.2 to 6 wt %, more specifically 0.2 to 5 wt %, and still more specifically 0.25 to 2.5 wt %, based on the total weight of the poly (carbonate-siloxane-arylate), with the proviso that the siloxane units are provided by polysiloxane units covalently bonded in the polymer backbone of the poly(carbonate-siloxane-arylate); 50 to 99.6 wt % or 75 to 91 wt % arylate units, and 0.2 to 49.8 wt % carbonate units, wherein the combined weight percentages of the polysiloxane units, arylate units, and carbonate units is 100 wt % of the total weight of the poly(carbonate-siloxane-arylate), and optionally the carbonate units include 1 to 10.3 wt % bisphenol A carbonate units and 2.5 to 13 wt. % of resorcinol carbonate units. In another embodiment, the poly(carbonate-siloxane-arylate) comprises 0.25 to 2 wt % polysiloxane units, 60 to 94.75 wt % arylate units, and 3.25 to 39.75 wt % carbonate units, wherein the combined weight percentages of the polysiloxane units, ester units, and carbonate units is 100 wt % of the total weight of the poly(carbonate-siloxane-arylate). In a specific embodiment, the siloxane content of the poly(carbonate-siloxane-arylate) is 0.6 to 1.5 wt. % based on the total weight of the poly(carbonate-siloxane-arylate) copolymer.

The polycarbonate copolymers comprising resorcinol arylate ester units derived from a resorcinol composition as described herein can have an $M_w$, of 10,000 to 100,000 g/mol, specifically 10,000 to 75,000 g/mol, more specifically 10,000 to 50,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

The polycarbonate copolymers comprising resorcinol arylate ester units derived from a resorcinol composition as described herein has a molar ratio of carbonate carbonyl groups relative to ester carbonyl groups of 0.13:1 to 0.20:1 as determined by Fourier transform infrared spectroscopy; and a percent ester carbonyl content of 91 to 84 mol % as determined by $^{13}C$ nuclear magnetic resonance spectroscopy using the equation:

$$\text{Percent ester carbonyl content} = \frac{\begin{bmatrix}\text{Ester carbonyl content of}\\ \text{arylate-resorcinol-arylate} +\\ \text{sequences}\end{bmatrix} \begin{pmatrix}\text{Ester carbonyl content of}\\ 0.5 * \text{arylate-resorcinol-carbonate}\\ \text{sequences}\end{pmatrix}}{\begin{bmatrix}\text{Ester carbonyl content of}\\ \text{arylate-resorcinol-arylate} +\\ \text{sequences}\end{bmatrix} \text{Ester carbonyl content of arylate-resorcinol-carbonate} + \text{sequences} \begin{bmatrix}\text{Carbonate carbonyl content of}\\ \text{carbonate-resorcinol-carbonate}\\ \text{sequences}\end{bmatrix}} * (100).$$ (Equation 1)

In an embodiment, an unmolded powder sample of the polycarbonate copolymer has a glass transition temperature of 139° C. or higher determined by differential scanning calorimetry (DSC) as per ASTM D3418 with a 10° C./min heating rate.

A sample of the polycarbonate copolymer can have a yellowness index of less than 8.5 as measured by ASTM D1925 on a 3.2 mm thick plaque molded at 580° F. after drying to a moisture content of less than 0.65%.

A powder sample of polycarbonate copolymer can have a fluorescent emission intensity at 450 nm of less than 1.2 lumens*sec after excitation at 375 nm as determined by high performance liquid chromatography.

In specific embodiments, the polycarbonate copolymer is a poly(carbonate-siloxane-arylate), and the resorcinol composition has a hydroquinone content of 50 to 500 parts per million, or 60 to 200 parts per million, or 100 to 150 parts per million, a catechol content of 10 to 30 pans per million, or 10 to 25 parts per million, or 15 to 25 parts per million, and a phenol content of 50 to 2400 parts per million, or 800 to 2400 pans per million, or 1000 to 2000 parts per million, each as determined by high performance liquid chromatography. Such a poly(carbonate-siloxane-arylate) has a molar ratio of carbonate carbonyl groups relative to ester carbonyl groups of 0.13:1 to 0.20:1, or 0.13:1 to 0.15:1 as determined by Fourier transform infrared spectroscopy; and a percent ester carbonyl content of 91 to 84 mol % or 91 to 89 mol % as determined by $^{13}$C nuclear magnetic resonance spectroscopy using Equation 1 disclosed herein.

In another specific embodiment, the polycarbonate copolymer is a poly(carbonate-siloxane-arylate), and wherein the resorcinol composition has a hydroquinone content of 400 to 1200 parts per million, a catechol content of 4 to 11 parts per million, and a phenol content of 0 parts per million, each as determined by high performance liquid chromatography. Such a poly(carbonate-siloxane-arylate) has a molar ratio of carbonate carbonyl groups relative to ester carbonyl groups of 0.16:1 to 0.20:1 as determined by Fourier transform infrared spectroscopy; and a percent ester carbonyl content of 88 to 84 mol % as determined by $^{13}$C nuclear magnetic resonance spectroscopy using Equation 1 disclosed herein. Surprisingly, when the resorcinol composition is stabilized with gluconic acid, the polycarbonate copolymer derived therefrom has an improved yellowness index as compared to a polycarbonate copolymer derived from an otherwise same resorcinol composition except for being stabilized with citric acid. Thus in an embodiment the stabilizer comprises gluconic acid, and a molded sample of the polycarbonate copolymer powder has a yellowness index of less than 13 as measured by ASTM D1925 on a 3.2 mm thick plaque. A copolymer derived from a resorcinol composition stabilized with gluconic acid can also have a higher glass transition temperature than the copolymers derived from an otherwise same resorcinol composition except for being stabilized with citric acid. Thus in an embodiment the stabilizer comprises gluconic acid, an unmolded powder sample of the polycarbonate copolymer has a glass transition temperature of 139° C. or higher determined by differential scanning calorimetry (DSC) as per ASTM D3418 with a 10° C./min heating rate. It is also discovered that the chain architecture of the copolymers can be adjusted by adjusting the stabilizer used in the resorcinol composition. A copolymer prepared from a resorcinol composition stabilized with gluconic acid can have a higher ITR blocks content, a lower arylate-resorcinol-carbonate content, and a lower carbonate-resorcinol-carbonate content, each on a percent basis compared to the copolymers prepared from an otherwise same resorcinol composition except for being stabilized with citric acid, as determined by $^{13}$C NMR.

In yet another specific embodiment, the polycarbonate copolymer is a poly(carbonate-siloxane-arylate) The polycarbonate copolymer as described herein comprise, based on the total weight of the polycarbonate copolymer, 1 to 10.3 wt. % bisphenol A carbonate units; 2.5 to 13 wt. % of resorcinol carbonate units; 0.25 to 2.5 wt. % siloxane units of the formulas

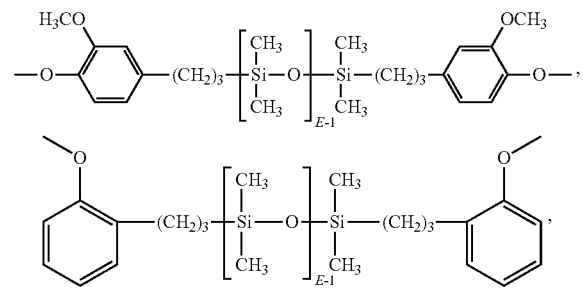

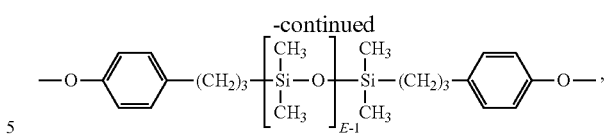

or a combination comprising at least one of the foregoing, wherein E has an average value of 5 to 15 wt. %; make sure in specification the siloxane content being 0.6 to 1.5 wt. %, based on the total weight of the polycarbonate copolymer; and 75 to 91 weight percent of resorcinol isophthalate/terephthalate ester units derived from a resorcinol composition having a hydroquinone content of 60 to 200 parts per million, a catechol content of 10 to 30 parts per million, and a phenol content of 800 to 2400, each as determined by high performance liquid chromatography, and a $C_{4-12}$ hydroxy-substituted carboxylic acid stabilizer.

The polycarbonate copolymers can be manufactured by different methods such as solution polymerization, interfacial polymerization, and melt polymerization as is known in the art. In an embodiment, the polycarbonate copolymers are prepared by interfacial polymerization. Generally, the polycarbonate copolymers are provided by the reaction of a diacid derivative, optionally a difunctional siloxane, a resorcinol based monomer, a dihydroxy aromatic compound other than the resorcinol based monomer, and, a carbonyl source, in a biphasic medium comprising an immiscible organic phase and aqueous phase. In an embodiment, the arylate unit is formed by reacting a resorcinol based monomer and a dicarboxylic acid dichloride in a biphasic medium in the presence of a base.

An exemplary method for forming a polycarbonate copolymer comprises reacting a combination comprising a dicarboxylic acid dihalide, optionally a dihydroxy siloxane, and a resorcinol composition having an impurity profiled as disclosed herein to provide an arylate-resorcinol-arylate polymer; and reacting the arylate-resorcinol-arylate polymer with a bisphenol and a carbonate precursor preferably at a pH of less than 11, more preferably at a pH of less than 10 or less than 9 to provide the polycarbonate copolymer. A base can be used. Exemplary bases include, for example, triethylamine, sodium hydroxide, sodium carbonate, sodium bicarbonate, sodium acetate, sodium gluconate, sodium citrate, sodium tartrate, and the like, or a combination comprising at least one of the foregoing. The medium in which the arylate-resorcinol-arylate polymer is formed can be maintained at a suitable pH while combining and reacting, and is biphasic, having a solvent phase and an aqueous phase. In an embodiment, the pH is of 4 to 11.5 more specifically 4 to 8.5. The pH may be adjusted by addition of a suitable base, for example sodium hydroxide as a concentrated solution in water, as needed during the reaction to form the arylate-resorcinol-arylate polymer. In an embodiment, the diacid derivative compound is 1,4-terephthaloyl dichloride, 1,3-isophthaloyl dichloride, or a mixture of these acid chlorides. The arylate-resorcinol-arylate polymers can have a weight average molecular weight of 2,000 to 80,000 Daltons, specifically 3,000 to 50,000 Daltons, more specifically 4,000 to 20,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.0 ml per minute. After the arylate-resorcinol-arylate polymer is formed, then the mixture may be charged with an additional dihydroxy aromatic compound, a carbonyl compound, additional solvent, and a base to maintain the pH of the reaction from 8.5 to 11 or from 8.5 to 10. It has been discovered that if the pH is greater than 11, the produced polycarbonate copolymer can have an increased yellowness index. In an embodiment, the carbonyl compound is phosgene. A chain stopper can be included in the reaction to prepare the arylate-resorcinol-arylate polymer and/or the reaction to produce the polycarbonate copolymer. All types of end groups are contemplated as being useful, e.g., phenol, cyanophenol, or para-cumyl phenol, provided that such end groups do not significantly affect desired properties of the thermoplastic compositions.

A resorcinol composition having the impurity profile as described herein can also be used in other methods as disclosed in U.S. Pat. No. 7,790,292 to prepare poly(carbonate-siloxane-arylate)s. The content of U.S. Pat. No. 7,790,292 is incorporated herein by reference in its entirety.

The polycarbonate copolymer can be incorporated into a thermoplastic composition. The thermoplastic composition optionally further comprise an additional polymer that is not the same as the polycarbonate copolymer. The additional polymer can be a polycarbonate including repeating carbonate units as described above, including homopolycarbonates, copolycarbonates, polycarbonate-esters, polycarbonate-siloxanes, polyesters, polyetherimides, polyetherimide-siloxanes, or a combination comprising at least one of the foregoing.

In an embodiment, polycarbonate copolymer is a poly (carbonate-siloxane-arylate), and the additional polymer is a polycarbonate-ester, in particular an aromatic polycarbonate-ester having aromatic carbonate units of formula (1) and arylate units of formula (4). For example, the aromatic polycarbonate-ester can consist essentially of 50 to 100 mole percent of arylate units of formula (4), and 0 to 50 mole percent aromatic carbonate units derived from bisphenol compounds of formula (3). It is appreciated that the additional polymer can not contain any siloxane units.

In another embodiment, the additional polymer is a polyester for example, polyesters having repeating units of formula (4) wherein T can be aromatic or aliphatic, and, which include poly(alkylene dicarboxylates), liquid crystalline polyesters, and polyester copolymers. The polyesters described herein are desirably completely miscible with the polycarbonates when blended. Where a polyester is combined with a poly(carbonate-siloxane-arylate) or a poly (carbonate-siloxane-arylate), the polyester desirably comprises or contributes a minimum amount of saturated hydrocarbon in the form of substituents or structural groups such as bridging groups or other connective groups. In another embodiment, less than or equal to 20 mol %, specifically less than or equal to 10 mol %, and still more specifically less than or equal to 5 mol % of the combined non-arylate ester units, arylate ester units, and carbonate units comprise alkyl, alkoxy, or alkylene groups. In a specific embodiment, less than or equal to 30 mol %, specifically less than or equal to 25 mol %, and still more specifically less than or equal to 20 mol % of the ester units comprise alkyl, alkoxy, or alkylene groups, based on the combined moles of arylate ester units and carbonate units. In another embodiment, the arylate ester units and the carbonate units are not substituted with non-aromatic hydrocarbon-containing substituents.

Examples of polyesters include poly(ethylene terephthalate) (PET), poly(1,4-butylene terephthalate) (PBT), poly (propylene terephthalate) (PPT), poly(ethylene naphthanoate) (PEN), poly(butylene naphthanoate) (PBN), poly(1,4-cyclohexanedimethylene terephthalate) (PCT), poly(1,4-cyclohexanedimethylene terephthalate)-co-poly(ethylene terephthalate), abbreviated as PETG where the polymer comprises greater than or equal to 50 mole % of poly (ethylene terephthalate), and abbreviated as PCTG where the polymer comprises greater than 50 mole % of poly(1, 4-cyclohexanedimethylene terephthalate), and poly(1,4-cyclohexane-dimethanol-1,4-cyclohexanedicarboxylate) (PCCD). Preferred polyesters are poly(isophthalate-terephthalate-resorcinol) esters, poly(isophthalate-terephthalate-bisphenol-A) esters, and poly[(isophthalate-terephthalate-resorcinol) ester-co-(isophthalate-terephthalate-bisphenol-A)] ester.

When the thermoplastic composition comprises the polycarbonate copolymer and an optional additional polymer, the weight ratio of polycarbonate copolymer to additional polymer in the base layer can be, respectively, 1:99 to 99:1, specifically 10:90 to 90:10, more specifically 20:80 to 80:20, and still more specifically 30:70 to 70:30 or 40:60 to 60:40. It is understood that, where an added polymer, combination of polymers, or any other additive is used, the amount and type of the added polymer(s) or additive is selected such that the desired properties of the polycarbonate copolymer in the thermoplastic composition are not substantially adversely affected. In an embodiment only polycarbonate homopolymers or polycarbonate copolymers as described herein are used in the thermoplastic composition.

In addition to the polycarbonate copolymer, the thermoplastic compositions can include various additives ordinarily incorporated into polymer compositions of this type, with the proviso that the additive(s) are selected so as to not significantly adversely affect the desired properties of the thermoplastic compositions. Such additives can be mixed at a suitable time during the mixing of the components for forming the composition. Additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the thermoplastic compositions.

The thermoplastic compositions can be manufactured by various methods. For example, powdered polycarbonate copolymer, and other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat or downstream through a side-stuffer. Additives can also be compounded into a masterbatch with a desired polymer and fed into the extruder. The extruder is generally operated at a temperature higher than that necessary to cause the composition to flow. The extrudate is immediately quenched in a water bath and pelletized. The pellets so prepared can be one-fourth inch long or less as desired. Such pellets can be used for subsequent molding, shaping, or forming. In a specific embodiment, the pellets are used to make extruded films or sheets.

Shaped, formed, or molded articles comprising the polycarbonate copolymer or the thermoplastic compositions containing the polycarbonate copolymer are also provided. The thermoplastic compositions can be molded into useful shaped articles by a variety of methods, such as injection molding, extrusion, rotational molding, blow molding, and thermoforming Some example of articles include extruded films or sheets, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In other embodiments the articles can include a weatherable opaque part, or a tractor hood, a tractor side panel, an automotive grill or other part, and the like. In addition, the thermoplastic compositions can be used for the manufacture of transportation components.

As used herein, a "transportation component" is an article or portion of an article used in rolling stock, an aircraft, a roadway vehicle, or a marine vehicle. "Rolling stock" includes but is not limited to a locomotive, coach, light rail vehicle, underground rail vehicle, tram, trolley, magnetic levitation vehicle, and a cable car. An "aircraft" includes but is not limited to a jet, an airplane, an airship, a helicopter, a balloon, and a spacecraft. A "roadway vehicle" includes but is not limited to an automobile, bus, scooter and a motorcycle. A "marine vehicle" includes but is not limited to a boat, a ship (including freight and passenger ships), jet skis, and a submarine.

Exemplary transportation components for rolling stock (e.g., trains), aircraft, and roadway and marine vehicles, particularly rolling stock, includes interior components (e.g., structure and coverings) such as ceiling paneling, flaps, boxes, hoods, louvers, insulation material and the body shell in interiors, side walls, front walls/end walls, partitions, room dividers, interior doors, interior lining of the front-/end-wall doors and external doors, luggage overhead luggage racks, vertical luggage rack, luggage container, luggage compartments, windows, window frames, kitchen interiors, surfaces or a component assembly comprising at least one of the foregoing.

The thermoplastic compositions are particularly useful in train and aircraft, for example a variety of aircraft compartment interior applications, as well as interior applications for other modes of transportation, such as bus, train, subway, marine, and the like. In a specific embodiment the articles are interior components for aircraft or trains, including access panels, access doors, air flow regulators baggage storage doors, display panels, display units, door handles, door pulls, enclosures for electronic devices, food carts, food trays, grilles, handles, magazine racks, seat components, partitions, refrigerator doors, seat backs, side walls, tray tables, trim panels, and the like. The polycarbonate copolymer or thermoplastic compositions can be formed (e.g., molded) into sheets that can be used for any of the above mentioned components. It is generally noted that the overall size, shape, thickness, optical properties, and the like of the polycarbonate sheet can vary depending upon the desired application.

The polycarbonate copolymers are further illustrated by the following non-limiting examples.

EXAMPLES

The materials used in the Examples are described in Table 1.

TABLE 1

| Component | Chemical Description |
|---|---|
| RA | Resorcinol containing, as determined by HPLC: |
| | 128.7 ppm of hydroquinone |
| | 19.0 ppm catechol |
| | 1592.9 ppm of phenol |
| | organic acid stabilizer (gluconic acid) |
| RB | Resorcinol containing, as determined by HPLC: |
| | 11.4 ppm of hydroquinone |
| | less than 1.3 ppm of catechol if present |
| | 12.1 ppm of phenol |
| | organic acid stabilizer (gluconic acid) |
| RC | Resorcinol containing, as determined by HPLC: |
| | 783.4 ppm hydroquinone |
| | 7.06 ppm of catechol |
| | 0 ppm of phenol |
| | organic acid stabilizer (citric acid or gluconic acid) |
| PEPQ | Tetrakis(2,4-di-tert-butylphenyl)-4,4'-biphenylenediphosphonite |

Testing Methods

Hydroquinone, catechol, and phenol content of resorcinol was determined by high performance liquid chromatography (HPLC).

Weight average molecular weight was measured by gel permeation chromatography (GPC), using a crosslinked styrene-divinylbenzene column and calibrated to bisphenol A homopolycarbonate references.

All pH measurements were performed using a pH meter and probe, calibrated to standardized buffer solutions.

Glass transition temperature of unmolded powder sample was determined by differential scanning calorimetry (DSC) as per ASTM D3418 with a 10° C./min heating rate.

Carbonate carbonyl to ester carbonyl ratios were determined by Fourier transform infrared spectroscopy (FTIR) on polymer film or polymer powder or color plaque. The molar ratio of carbonate carbonyl to ester carbonyl is calculated based on the ratio of IR intensity at 1779 $cm^{-1}$ (carbonate carbonyl) to IR absorbance at 1733 $cm^{-1}$ (ester carbonyl) after the baseline treatment of FTIR spectrum. An exemplary spectrum for Comparative Example 2 is shown in FIG. 1.

Figure 2:
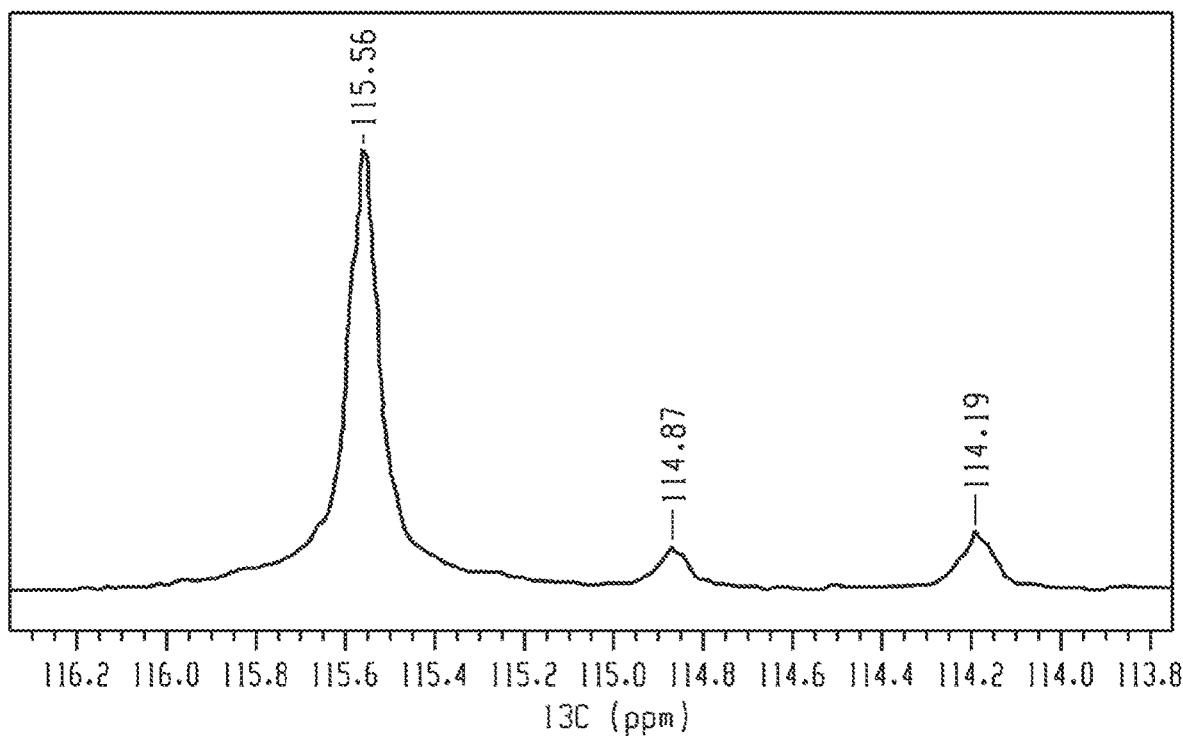
FIG. 2 is a $^{13}C$ nuclear magnetic resonance spectrum of the product of Example 1.
Figure 3:
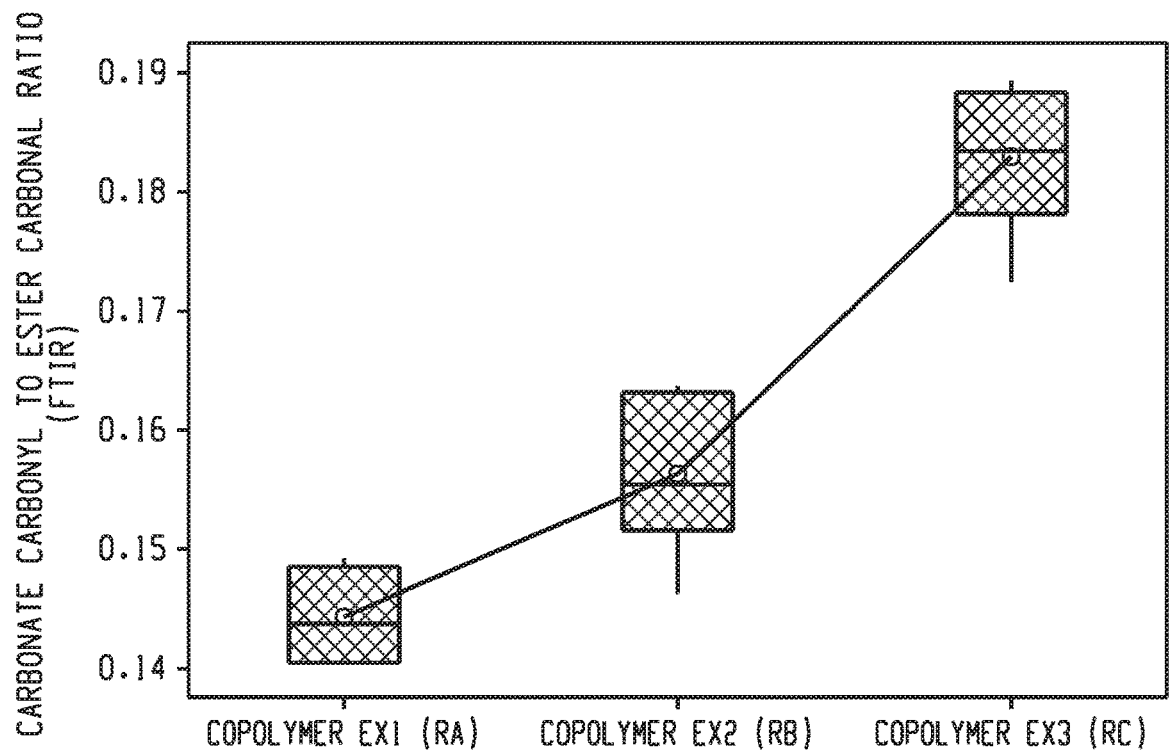
FIG. 3 is a graph showing the boxplot analyses of carbonate carbonyl to ester carbonyl ratio of the polymer samples of Examples 1-3 based on the data from FTIR spectroscopy.

The percent of ester carbonyl in the arylate-resorcinol-arylate blocks ("ITR blocks" when the arylate is isophthalic and terephthalic acid) and the arylate-resorcinol-carbonate blocks can be quantitated by $^{13}C$ NMR spectroscopy of the polymer powder dissolved in deuterated $CDCl_3$— using a VNMRS (Agilent) 500 MHz spectrometer. An exemplary $^{13}C$ NMR spectrum is shown in FIG. 2. In particular, the percent ester carbonyl content is calculated by Equation 1.

$$\text{Percent ester carbonyl content} = \frac{\begin{bmatrix}\text{Ester carbonyl content of} \\ \text{arylate-resorcinol-arylate +} \\ \text{sequences}\end{bmatrix} + \begin{pmatrix}\text{Ester carbonyl content of} \\ 0.5 * \text{arylate-resorcinol-carbonate} \\ \text{sequences}\end{pmatrix}}{\begin{bmatrix}\text{Ester carbonyl content of} \\ \text{arylate-resorcinol-arylate +} \\ \text{sequences} \\ \text{Ester carbonyl content of} \\ \text{arylate-resorcinol-carbonate +} \\ \text{sequences} \\ \text{Carbonate carbonyl content of} \\ \text{carbonate-resorcinol-carbonate} \\ \text{sequences}\end{bmatrix}} * (100). \quad (\text{Eq. 1})$$

Yellowness Index (YI) was calculated from the absorption spectrum from a MacBeth 9000A according to ASTM D1925-00.

Fluorescence emission intensity was measured at 450 nm after excitation at 375 nm using high performance liquid chromatography (HPLC) on an Agilent Technologies Model 1100 apparatus fitted with a monolithic silica column and a 254 nm detector. Polymer powders were dissolved in dichloromethane to provide samples having a concentration of 5 mg/ml. The sample injection volume was 50 µL, and the mobile phase was 100% dichloromethane at a flow rate of 1 ml/min.

Example 1

This example can be executed on either the pilot plant or manufacturing plant scale, e.g., on a scale of 200 to 9,000 pounds (90.7 to 4082 kilogram). To a reactor equipped with condenser, agitator, pH probes, and recirculation loops methylene chloride, triethylamine (1.5 to 2.5 wt % of RA), p-cumylphenol (3.8-4.2 wt % of RA), a dihydroxy siloxane (1.8-2.2 wt % of RA), and an aqueous solution of resorcinol RA was added. A molten mixture of isophthaloyl chloride and terephthaloyl chloride isomers (DAC, 50:50 ratio, up to stoichiometric ratio versus RA) was added to the reactor, while simultaneously adding a sodium hydroxide solution (33% w/w). The pH decreased to less than 7. After adding DAC, the pH was increased to about 9. The reactor contents were sampled for weight averaged molecular weight analyses of the RA-DAC-siloxane copolymer until the desired molecular weight was achieved.

The reactor was subsequently charged with bisphenol-A (9.8 moles per mole of averaged mol wt of polymer), water (0.20 to 0.24 v/w of RA solution), and methylene chloride (0.65 to 0.75 v/w of RA solution). Phosgene was co-fed with sodium hydroxide (33% w/w) to the reactor using a NaOH/phosgene mole ratio to maintain the pH at 7 to 9. After the completion of polymerization, the reaction batches were purified to separate the catalyst and salts from the polymer solution. Solvents were then removed from the resulting polymeric solution to isolate the reaction product copolymer as a powder. Fourteen batches of the polymer were prepared in this manner. These powder samples were subsequently used for physical characterization.

Example 2 (Comparative)

Example 1 was repeated except that in Example 2, resorcinol composition RB was used. Sixteen batches of the polymer were prepared. An identical set of characterizations were performed on these samples.

Example 3

Example 1 was repeated except that in Example 3, resorcinol composition RC stabilized with citric acid was used. Fifteen batches of the polymer were prepared. An identical set of characterizations were performed on these samples.

Results and Discussion

Samples prepared according to Examples 1 to 3 were analyzed by FTIR, and $^{13}$C NMR spectroscopy. The results are shown in Table 2 and FIG. 2.

Surprisingly, it has been discovered that the poly(carbonate-siloxane-arylate) copolymer derived from RA (Example 1) has a lower carbonate carbonyl content relative to ester carbonyl content compared to the copolymers derived from RB or RC, as determined by FTIR. In addition the poly(carbonate-siloxane-arylate) copolymer derived from RA (Example 1) had a higher ester carbonyl content on a percent basis compared to the copolymers derived from RB (Comparative Example 2) or RC (Example 3), as determined by $^{13}$C NMR. Thus, overall, the carbonate:ester ratio was lower for the copolymer derived from RA as measured by FTIR and by $^{13}$C NMR. It is unexpected that the ratio of carbonate:ester can be adjusted by adjusting the particular amounts of hydroquinone, catechol, and phenol in the resorcinol composition.

TABLE 2

| Copolymer | Ex 1 (RA) | Ex 2 (RB)* | Ex 3 (RC) |
|---|---|---|---|
| Carbonate Carbonyl to Ester Carbonyl Ratio (FTIR) | | | |
| Average Value | 0.144 | 0.157 | 0.183 |
| Range | 0.141 to 0.149 | 0.147 to 0.164 | 0.173 to 0.190 |
| Percent ester ($^{13}$C NMR) | | | |
| Average Value | 89.69 | 88.05 | 86.00 |
| Range | 88.90 to 90.14 | 86.94 to 88.87 | 85.30 to 86.68 |

*Comparative

The glass transition temperatures of the poly(carbonate-siloxane-arylate) powders derived from RA (Example 1), RB (Example 2), and RC (Example 3) were evaluated, and the results are summarized in Table 3. As shown in Table 3, the copolymer derived from RA has the higher glass transition temperature among the copolymers derived from RA, RB, and RC. The result is surprising particularly with respect to the copolymers prepared from RA. RA contains more impurities than RB, yet the copolymers derived from RA have a higher glass transition temperature than copolymers derived from RB.

TABLE 3

| Copolymer | Ex 1 (RA) | Ex 2 (RB)* | Ex 3 (RC) |
|---|---|---|---|
| Glass Transition Temperature, ° C. | 140.2 | 138.2 | 137.7 |
| standard deviation | 0.5 | 0.6 | 0.3 |

*Comparative

Polymer powders were dried to a volatiles content of less than 0.15%, combined with 0.06 parts per hundred of polymer (pph) PEPQ stabilizer, then fed into an injection molding machine where 0.32 mm inch color plaques were produced at a molding temperature of 550-580° C. The yellowness index of the molded plaques was measured. The results are shown in Table 4 and FIG. 5. The results indicate that plaques of the copolymer derived from RA have the lowest average YI of 7.3 among the samples tested.

TABLE 4

|  | Ex 1 (RA) | Ex 2 (RB)* | Ex 3 (RC) |
|---|---|---|---|
| No of Samples | 14 | 16 | 15 |
| Mean | 7.3 | 8.3 | 14.5 |
| Standard deviation | 0.63 | 0.78 | 1.15 |

*Comparative

Figure 4:
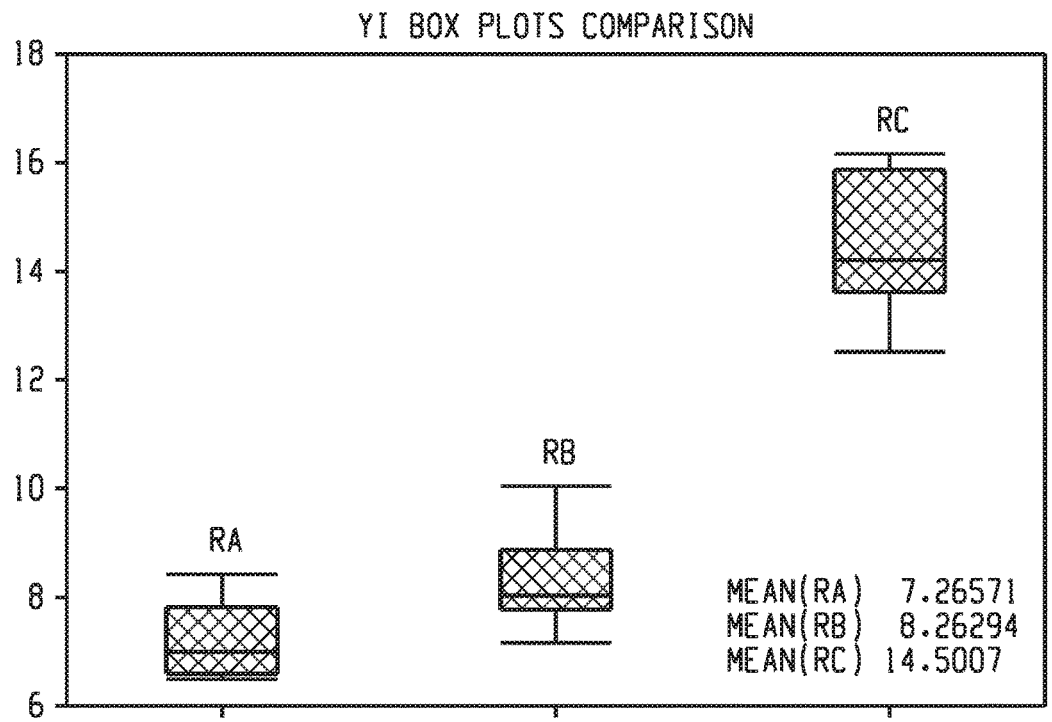
FIG. 4 is a graph showing the boxplot comparison of the yellowness index of plaques molded from polymer samples of Examples 1-3.

A box plot representation of this YI data is shown in FIG. 4. The plots visually present the difference between the YI data sets for copolymers derived from RA, RB, and RC.

Statistical analysis of the YI data using Tukey's t-test also shows that the YI for the copolymer derived from RB is statistically significantly lower than that of the copolymer derived from RC. In addition, YI for the copolymer derived from RA is statistically significantly lower than that of the copolymer derived from RB.

Molded plaques of the copolymer derived from RA have lower average YI than the plaques of the copolymers derived from RB or RC. The result is surprising particularly with respect to the copolymers prepared from RA. RA contains more impurities than RB, yet copolymers derived from RA have a lower YI than copolymers derived from RB.

Polycarbonate auto-fluorescence is widely used to investigate polymer instability and decomposition. Fluorescence emission at 450 nm is not desirable and should be minimized; and low auto-fluorescence is desirable for stability. In some application areas, higher levels of polymer fluorescence are also known to interfere with analytical instrumentation which relies on fluorescence detection. Poly(carbonate-siloxane-arylate) samples from Examples 1 to 3 were analyzed for fluorescence emission intensity at 450 nm, and the results are shown in Table 5.

TABLE 5

| Copolymer | Ex 1 (RA) | Ex 2 (RB)* | Ex 3 (RC) |
|---|---|---|---|
| Fluorescence Intensity (lumens*second) | 0.95 | 1.27 | 2.28 |
| Standard error | 0.02 | 0.12 | 0.25 |

*Comparative

The results indicate that the copolymer derived from RA (Example 1) has the lowest level of auto-fluorescence among the copolymers derived from RA, RB, and RC. The result is surprising particularly with respect to the copolymers prepared from RA. RA contains more impurities than RB, yet copolymers derived from RA have a lower level of auto-fluorescence than copolymers derived from RB.

Examples 4 and 5

Pilot scale trials were conducted following the procedure of Example 1 except that in Example 4, resorcinol composition RC stabilized with citric acid was used, and in Example 5, resorcinol composition RC stabilized with gluconic acid was used.

Figure 5:
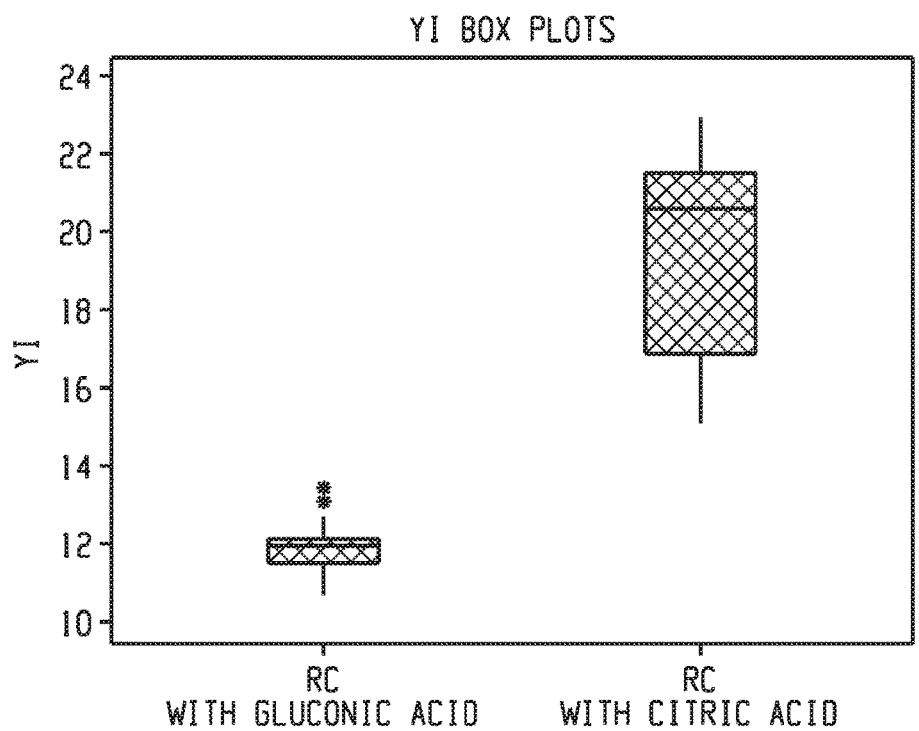
FIG. 5 is a graph showing the boxplot comparison of the yellowness index of plaques molded from polymer samples of Examples 4 and 5.

Poly(carbonate-siloxane-arylate) powders prepared according to Examples 4 to 5 were dried to a volatiles content of less than 0.15%, combined with 0.06 parts per hundred of polymer (pph) PEPQ stabilizer, then fed into an injection molding machine where 0.32 mm inch color plaques were produced at a molding temperature of 550-580° C. The yellowness index of the molded plaques was measured. A box plot representation of this YI data is shown in FIG. 5. As shown in FIG. 5, molded plaques of the copolymer derived from RC stabilized with gluconic acid have a significantly lower YI than the plaques of the copolymers derived from RC stabilized with citric acid.

The poly(carbonate-siloxane-arylate) copolymers prepared according to Examples 4 and 5 were analyzed by $^{13}C$ NMR spectroscopy for chain architecture and by DSC for glass transition temperature. The results are summarized in Table 6. The results of Example 4 are from five batches.

TABLE 6

| Sample | ITR blocks % | Arylate-Rs-Carbonates % | Carbonates-Rs-Carbonates % | Tg (° C.) |
|---|---|---|---|---|
| Example 4 Average | 81.75 | 7.03 | 11.22 | 137.38 |
| Standard Deviation | 0.72 | 0.16 | 0.62 | 0.87 |
| Example 5 | 86.88 | 5.06 | 8.06 | 139.5 |

As shown in Table 6, the copolymer derived from RC stabilized with gluconic acid has a higher glass transition temperature than the copolymers derived from RC stabilized with citric acid. The data also shows that the copolymer prepared from RC stabilized with gluconic acid has a higher ITR blocks content, a lower arylate-resorcinol-carbonate content, and a lower carbonate-resorcinol-carbonate content, each on a percent basis compared to the copolymers prepared from RC stabilized with citric acid, as determined by $^{13}C$ NMR. It is unexpected that the chain architecture of the copolymers can be adjusted by adjusting the stabilizer used in the resorcinol composition.

Effects of Maximum pH after Addition of DAC on the YI of the Stabilized Copolymer Pellets Example 1 was repeated using RA or RB. The maximum pH after the addition of DAC was controlled to be in a range of 9 to 12. The YI of plaques molded from PEPQ stabilized copolymer pellets were evaluated, and the results are summarized in FIG. 6.

Figure 6:
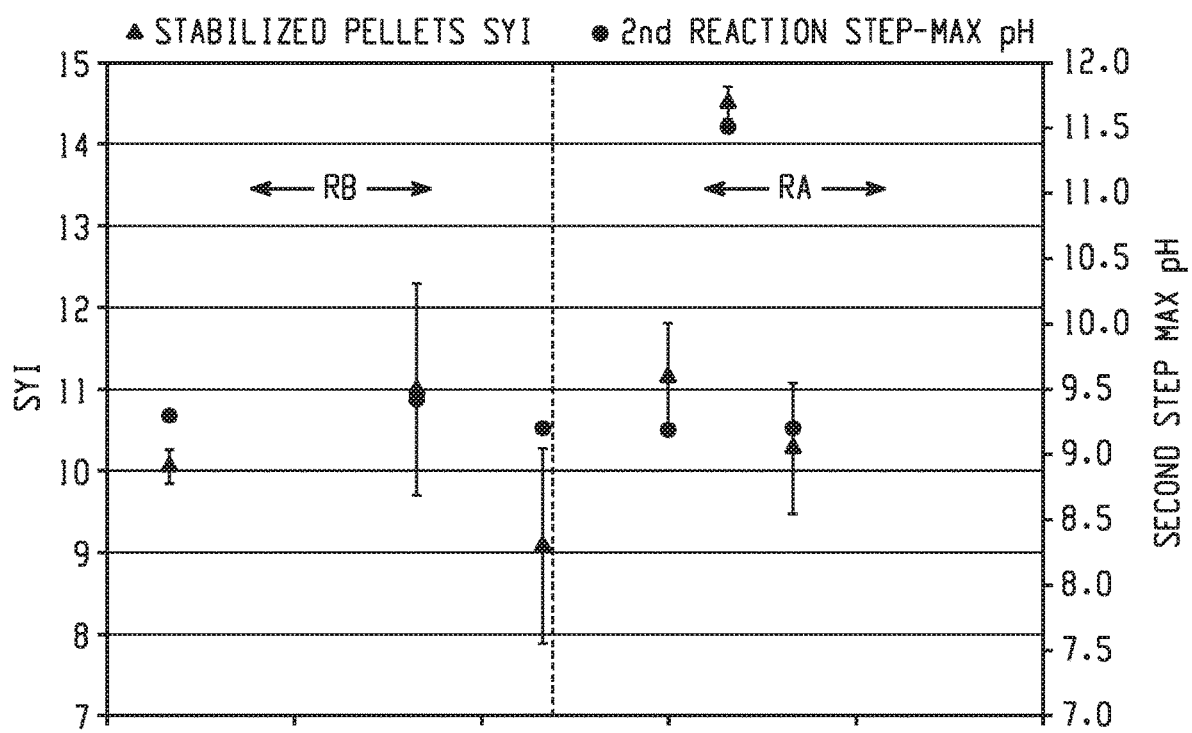
FIG. 6 is a graph showing the relationship of yellowness index of plaques molded from stabilized polymer pellets and the maximum pH of the reaction mixture after the addition of DAC.

As shown in FIG. 6, when the peak pH of the reaction mixture is above 11 after the addition of DAC, the YI of the copolymer increases to greater than 14. In contrast, when the peak pH of the reaction mixture is below 11 after the addition of DAC, the YI of the copolymer can be below 11. The data illustrates the importance of maintaining the peak pH after addition of DAC to be below 11.

Set forth below are various embodiments of the disclosure.

Embodiment 1

A polycarbonate copolymer comprising: aromatic carbonate units; optionally siloxane units; and resorcinol arylate ester units derived from a resorcinol composition having a hydroquinone content of 50 to 1200 parts per million, a catechol content of 5 to 29 parts per million, and a phenol content of 0 to 2400, each as determined by high performance liquid chromatography, and an acid stabilizer.

Embodiment 2

The polycarbonate copolymer of Embodiment 1, having a molar ratio of carbonate carbonyl groups relative to ester carbonyl groups of 0.13:1 to 0.20:1 as determined by Fourier transform infrared spectroscopy; and a percent ester carbonyl content of 91 to 84 mol % as determined by $^{13}$C nuclear magnetic resonance spectroscopy using the equation:

$$\text{Percent ester carbonyl content} = \frac{\left[\begin{array}{c}\text{Ester carbonyl content of}\\\text{arylate-resorcinol-arylate +}\\\text{sequences}\end{array}\right] - \left(\begin{array}{c}\text{Ester carbonyl content of}\\ 0.5 * \text{arylate-resorcinol-carbonate}\\\text{sequences}\end{array}\right)}{\left[\begin{array}{c}\text{Ester carbonyl content of}\\\text{arylate-resorcinol-arylate +}\\\text{sequences}\end{array}\right] \begin{array}{c}\text{Ester carbonyl content of}\\\text{arylate-resorcinol-carbonate +}\\\text{sequences}\\\text{Carbonate carbonyl content of}\\\text{carbonate-resorcinol-carbonate}\\\text{sequences}\end{array}} * (100).$$

Embodiment 3

The polycarbonate copolymer of any one or more of Embodiments 1 to 2, wherein an unmolded powder sample of the polycarbonate copolymer has a glass transition temperature of 139° C. or higher determined by differential scanning calorimetry (DSC) as per ASTM D3418 with a 10° C./min heating rate.

Embodiment 4

The polycarbonate copolymer of any one or more of Embodiments 1 to 3, wherein a molded sample of the polycarbonate copolymer powder has a yellowness index of less than 8.5 as measured by ASTM D1925 on a 3.2 mm thick plaque.

Embodiment 5

The polycarbonate copolymer of any one or more of Embodiments to 4, wherein a powder sample of the polycarbonate copolymer has a fluorescent emission intensity at 450 nm of less than 1.2 lumens*sec after excitation at 375 nm as determined by high performance liquid chromatography.

Embodiment 6

The polycarbonate copolymer of any one or more of Embodiments 1 to 5, wherein the polycarbonate copolymer is a poly(carbonate-siloxane-arylate), and the resorcinol composition has a hydroquinone content of 50 to 500 parts per million, or 60 to 200 parts per million, or 100 to 150 parts per million, a catechol content of 10 to 30 parts per million, or 10 to 25 parts per million, or 15 to 25 parts per million, and a phenol content of 50 to 2400 parts per million, or 800 to 2400 parts per million, or 1000 to 2000 parts per million, each as determined by high performance liquid chromatography.

Embodiment 7

The polycarbonate copolymer of Embodiment 6, having a molar ratio of carbonate carbonyl groups relative to ester carbonyl groups of 0.13:1 to 0.16:1 or 0.13:1 to 0.15:1 as determined by Fourier transform infrared spectroscopy; and a percent ester carbonyl content of 91 to 88 mol % or 91 to 89 mol % as determined by $^{13}$C nuclear magnetic resonance spectroscopy using the equation:

$$\text{Percent ester carbonyl content} = \frac{\left[\begin{array}{c}\text{Ester carbonyl content of}\\\text{arylate-resorcinol-arylate +}\\\text{sequences}\end{array}\right] - \left(\begin{array}{c}\text{Ester carbonyl content of}\\ 0.5 * \text{arylate-resorcinol-carbonate}\\\text{sequences}\end{array}\right)}{\left[\begin{array}{c}\text{Ester carbonyl content of}\\\text{arylate-resorcinol-arylate +}\\\text{sequences}\end{array}\right] \begin{array}{c}\text{Ester carbonyl content of}\\\text{arylate-resorcinol-carbonate +}\\\text{sequences}\\\text{Carbonate carbonyl content of}\\\text{carbonate-resorcinol-carbonate}\\\text{sequences}\end{array}} * (100).$$

Embodiment 8

The polycarbonate copolymer of any one or more of Embodiments 1 to 5, wherein the polycarbonate copolymer is a poly(carbonate-siloxane-arylate), and wherein the resorcinol composition has a hydroquinone content of 400 to 1200 parts per million, a catechol content of 4 to 11 parts per million, and a phenol content of 0 parts per million, each as determined by high performance liquid chromatography.

Embodiment 9

The polycarbonate copolymer of Embodiment 8, wherein the poly(carbonate-siloxane-arylate) has a molar ratio of carbonate carbonyl groups relative to ester carbonyl groups of 0.16:1 to 0.20:1 as determined by Fourier transform infrared spectroscopy; and a percent ester carbonyl content of 88 to 84 mol % as determined by $^{13}$C nuclear magnetic resonance spectroscopy using the equation:

$$\text{Percent ester carbonyl content} = \frac{\begin{bmatrix}\text{Ester carbonyl content of}\\ \text{arylate-resorcinol-arylate +}\\ \text{sequences}\end{bmatrix} - \begin{pmatrix}\text{Ester carbonyl content of}\\ 0.5*\text{arylate-resorcinol-carbonate}\\ \text{sequences}\end{pmatrix}}{\begin{bmatrix}\text{Ester carbonyl content of}\\ \text{arylate-resorcinol-arylate +}\\ \text{sequences}\\ \text{Ester carbonyl content of}\\ \text{arylate-resorcinol-carbonate +}\\ \text{sequences}\\ \text{Carbonate carbonyl content of}\\ \text{carbonate-resorcinol-carbonate}\\ \text{sequences}\end{bmatrix}} *(100).$$

Embodiment 10

The polycarbonate copolymer of any one or more of Embodiments 1 to 9, wherein the stabilizer is a mineral acid or an organic acid, wherein the organic acid stabilizer is a $C_{1-12}$ carboxylic acid, or a $C_{2-12}$ carboxylic acid, or a $C_{-12}$ carboxylic acid, or a carboxylic acid derivative of any of the foregoing.

Embodiment 11

The polycarbonate copolymer of Embodiment 10, wherein the organic acid stabilizer is a hydroxy-substituted carboxylic acid, a lactone, a hydroxy-substituted lactone, a polycarboxylic acid, a hydroxy-substituted polycarboxylic acid, or a combination comprising at least one of the foregoing.

Embodiment 12

The polycarbonate copolymer of Embodiment 11, wherein the stabilizer is oxalic acid, malic acid, citric acid, ascorbic acid, 2,3,4,5,6-pentahydroxyhexanoic acid, 2,3,4,5-tetrahydroxypentaanoic acid, gluconic acid, maleic acid, fumaric acid, HCl, phosphoric acid, phosphorous acid, lactic acid, formic acid, tartaric acid, tartronic acid, the corresponding lactone or $C_{1-6}$ alkyl ester of any of the foregoing, or a combination comprising at least one of the foregoing.

Embodiment 13

The polycarbonate copolymer of Embodiment 11, wherein the stabilizer is gluconic acid.

Embodiment 14

The polycarbonate copolymer of Embodiment 8, wherein the stabilizer comprises gluconic acid, and a molded sample of the polycarbonate copolymer powder has a yellowness index of less than 13 as measured by ASTM D1925 on a 3.2 mm thick plaque.

Embodiment 15

The polycarbonate copolymer of any one or more of Embodiments 1 to 14 comprising, based on the total weight of the polycarbonate copolymer, 1 to 10.3 weight percent bisphenol A carbonate units; 2.5 to 13 weight percent of resorcinol carbonate units; 0.25 to 2.5 weight percent of siloxane units of the formulas

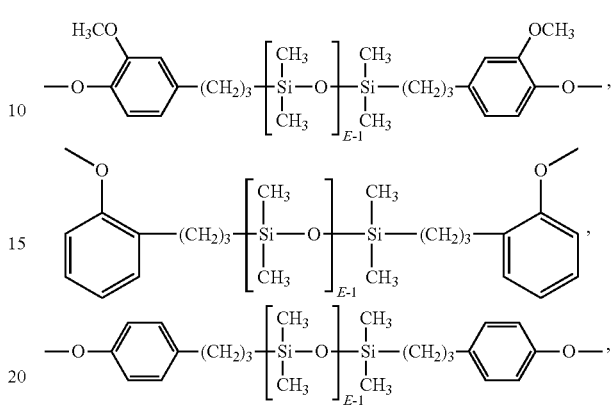

or a combination comprising at least one of the foregoing, wherein E has an average value of 5 to 15; the siloxane content being 0.6 to 1.5 wt. %, based on the total weight of the polycarbonate copolymer; and 75 to 91 weight percent of resorcinol isophthalate/terephthalate ester units derived from a resorcinol composition having a hydroquinone content of 60 to 200 parts per million, a catechol content of 10 to 30 parts per million, and a phenol content of 800 to 2400, each as determined by high performance liquid chromatography, and a $C_{4-12}$ hydroxy-substituted carboxylic acid stabilizer.

Embodiment 16

A thermoplastic composition comprising the polycarbonate copolymer of any one or more of Embodiments 1 to 15.

Embodiment 17

An article comprising the thermoplastic composition of Embodiment 16, wherein the article is a molded article, a fiber, a thermoformed article, an extruded film, an extruded sheet, one or more layers of a multi-layer article, a substrate for a coated article, or a substrate for a metallized article.

Embodiment 18

The article of Embodiment 17, wherein the article is a housing for a computer, business machine, or handheld electronic device, an electrical connectors, a component of lighting fixtures, ornaments, home appliances, roofs, greenhouses, sun rooms, swimming pool enclosures, a weatherable opaque part, a tractor hood, a tractor side panel, an automotive grill or other automotive part, or a transportation component.

Embodiment 19

An article comprising the thermoplastic composition of Embodiment 16, wherein the article is a transportation component, preferably ceiling paneling, flaps, boxes, hoods, louvers, insulation material in an interior body shells in interiors, side walls, front walls, end walls, partitions, room dividers, interior doors, interior lining of doors, luggage overhead luggage racks, vertical luggage racks, luggage containers, luggage compartments, windows, window frames, kitchen interior component, access panels, access doors, air flow regulators, baggage storage doors, display panels, display units, door handles, door pulls, enclosures for electronic devices, food carts, food trays, grilles, handles, magazine racks, seat components, refrigerator doors, seat backs, side walls, tray tables, or trim panels Embodiment 20

A method of manufacturing the polycarbonate copolymer of any one or more of Embodiments 1 to 15, the method comprising reacting a combination comprising a dicarboxylic acid dihalide, optionally a dihydroxy siloxane, and a resorcinol composition having a hydroquinone content of 5 to 1200 parts per million, a catechol content of 5 to 29 parts per million, a phenol content of 0 to 2400, each as determined by high performance liquid chromatography, and further comprising an organic stabilizer having at least a first pKa from 2.5 to 4.5, to provide an arylate-resorcinol-arylate polymer; and reacting the arylate-resorcinol-arylate polymer with a bisphenol and a carbonate precursor preferably at a pH of less than 11 to provide the polycarbonate copolymer.

Embodiment 21

A polycarbonate copolymer formed by the method of Embodiments 20, wherein the polycarbonate copolymer is a poly(carbonate-siloxane-arylate) having a molar ratio of carbonate carbonyl groups relative to ester carbonyl groups of 0.13:1 to 0.20:1 as determined by Fourier transform infrared spectroscopy; and a percent ester carbonyl content of 91 to 84 mol % as determined by $^{13}$C nuclear magnetic resonance spectroscopy using the equation:

$$\text{Percent ester carbonyl content} = \frac{\begin{bmatrix} \text{Ester carbonyl content of} \\ \text{arylate-resorcinol-arylate} + \\ \text{sequences} \end{bmatrix} - \begin{pmatrix} \text{Ester carbonyl content of} \\ 0.5 * \text{arylate-resorcinol-carbonate} \\ \text{sequences} \end{pmatrix}}{\begin{bmatrix} \text{Ester carbonyl content of} \\ \text{arylate-resorcinol-arylate} + \\ \text{sequences} \\ \text{Ester carbonyl content of} \\ \text{arylate-resorcinol-carbonate} + \\ \text{sequences} \\ \text{Carbonate carbonyl content of} \\ \text{carbonate-resorcinol-carbonate} \\ \text{sequences} \end{bmatrix}} * (100).$$

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" includes any combination comprising at least one of the listed components or properties optionally together with a like component or property not listed.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms; "cycloalkylene" refers to a divalent radical formed by the removal of two hydrogen atoms from two different carbon atoms on one or more rings of a cycloalkyl group; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include a nitro functional group (—NO$_2$), cyano (—CN), hydroxy (—OH), halogen, thiol (—SH), thiocyano (—SCN), C$_{2-6}$ alkanoyl (e.g., acyl (H$_3$CC(=O)—); carboxamido; C$_{1-6}$ or C$_{1-3}$ alkyl, cycloalkyl, alkenyl, and alkynyl (including groups having at least one unsaturated linkages and from 2 to 8, or 2 to 6 carbon atoms); C$_{1-6}$ or C$_{1-3}$ alkoxy; C$_{6-10}$ aryloxy such as phenoxy; C$_{1-6}$ alkylthio; C$_{1-6}$ or C$_{1-3}$ alkylsulfinyl; C1-6 or C$_{1-3}$ alkylsulfonyl; aminodi(C$_{1-6}$ or C$_{1-3}$)alkyl; C$_{6-12}$ aryl having at least one aromatic rings (e.g., phenyl, biphenyl, naphthyl, or the like, each ring either substituted or unsubstituted aromatic); C$_{7-19}$ arylalkyl having 1 to 3 separate or fused rings and from 6 to 18 ring carbon atoms; or arylalkoxy having 1 1 to 3 separate or fused rings and from 6 to 18 ring carbon atoms.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate copolymer comprising:
   aromatic carbonate units;
   optionally siloxane units; and
   resorcinol arylate ester units derived from a resorcinol composition having
      a hydroquinone content of 50 to 1200 parts per million,
      a catechol content of 5 to 29 parts per million, and
      a phenol content of 0 to 2400, each as determined by high performance liquid chromatography, and
   an acid stabilizer.

2. The polycarbonate copolymer of claim 1, having
   a molar ratio of carbonate carbonyl groups relative to ester carbonyl groups of 0.13:1 to 0.20:1 as determined by Fourier transform infrared spectroscopy; and
   a percent ester carbonyl content of 91 to 84 mol % as determined by $^{13}$C nuclear magnetic resonance spectroscopy using the equation:

$$\text{Percent ester carbonyl content} = \frac{\left[\begin{array}{c}\text{Ester carbonyl content of}\\\text{arylate-resorcinol-arylate} +\\\text{sequences}\end{array}\right]\left(\begin{array}{c}\text{Ester carbonyl content of}\\0.5*\text{arylate-resorcinol-carbonate}\\\text{sequences}\end{array}\right)}{\left[\begin{array}{c}\text{Ester carbonyl content of}\\\text{arylate-resorcinol-arylate} +\\\text{sequences}\end{array}\right]\begin{array}{c}\text{Ester carbonyl content of}\\\text{arylate-resorcinol-carbonate} +\\\text{sequences}\\\text{Carbonate carbonyl content of}\\\text{carbonate-resorcinol-carbonate}\\\text{sequences}\end{array}}*(100).$$

3. The polycarbonate copolymer of claim 1, wherein an unmolded powder sample of the polycarbonate copolymer has a glass transition temperature of 139° C. or higher determined by differential scanning calorimetry (DSC) as per ASTM D3418 with a 10° C/min heating rate.

4. The polycarbonate copolymer of claim 1, wherein a molded sample of the polycarbonate copolymer powder has a yellowness index of less than 8.5 as measured by ASTM D1925 on a 3.2 mm thick plaque.

5. The polycarbonate copolymer of claim 1, wherein a powder sample of the polycarbonate copolymer has a fluorescent emission intensity at 450 nm of less than 1.2 lumens*sec after excitation at 375 nm as determined by high performance liquid chromatography.

6. The polycarbonate copolymer of claim 1, wherein the polycarbonate copolymer is a poly(carbonate-siloxane-arylate), and the resorcinol composition has
   a hydroquinone content of 50 to 500 parts per million, or 60 to 200 parts per million, or 100 to 150 parts per million,
   a catechol content of 10 to 30 parts per million, or 10 to 25 parts per million, or 15 to 25 parts per million, and
   a phenol content of 50 to 2400 parts per million, or 800 to 2400 parts per million, or 1000 to 2000 parts per million,
each as determined by high performance liquid chromatography.

7. The polycarbonate copolymer of claim 6, having a molar ratio of carbonate carbonyl groups relative to ester carbonyl groups of 0.13:1 to 0.16:1 or 0.13:1 to 0.15: 1 as determined by Fourier transform infrared spectroscopy; and
   a percent ester carbonyl content of 91 to 88 mol % or 91 to 89 mol % as determined by $^{13}$C nuclear magnetic resonance spectroscopy using the equation:

$$\text{Percent ester carbonyl content} = \frac{\left[\begin{array}{c}\text{Ester carbonyl content of}\\\text{arylate-resorcinol-arylate} +\\\text{sequences}\end{array}\right]\left(\begin{array}{c}\text{Ester carbonyl content of}\\0.5*\text{arylate-resorcinol-carbonate}\\\text{sequences}\end{array}\right)}{\left[\begin{array}{c}\text{Ester carbonyl content of}\\\text{arylate-resorcinol-arylate} +\\\text{sequences}\end{array}\right]\begin{array}{c}\text{Ester carbonyl content of}\\\text{arylate-resorcinol-carbonate} +\\\text{sequences}\\\text{Carbonate carbonyl content of}\\\text{carbonate-resorcinol-carbonate}\\\text{sequences}\end{array}}*(100).$$

8. The polycarbonate copolymer of claim 1, wherein the polycarbonate copolymer is a poly(carbonate-siloxane-arylate), and wherein the resorcinol composition has
   a hydroquinone content of 400 to 1200 parts per million,
   a catechol content of 4 to 11 parts per million, and
   a phenol content of 0 parts per million,
each as determined by high performance liquid chromatography.

9. The polycarbonate copolymer of claim 8, wherein the poly(carbonate-siloxane-arylate) has
   a molar ratio of carbonate carbonyl groups relative to ester carbonyl groups of 0.16:1 to 0.20:1 as determined by Fourier transform infrared spectroscopy; and
   a percent ester carbonyl content of 88 to 84 mol % as determined by $^{13}$C nuclear magnetic resonance spectroscopy using the equation:

$$\text{Percent ester carbonyl content} = \frac{\begin{bmatrix}\text{Ester carbonyl content of} \\ \text{arylate-resorcinol-arylate +} \\ \text{sequences} \end{bmatrix} + \begin{pmatrix} \text{Ester carbonyl content of} \\ 0.5 * \text{arylate-resorcinol-carbonate} \\ \text{sequences} \end{pmatrix}}{\begin{bmatrix}\text{Ester carbonyl content of} \\ \text{arylate-resorcinol-arylate +} \\ \text{sequences} \\ \text{Ester carbonyl content of} \\ \text{arylate-resorcinol-carbonate +} \\ \text{sequences} \\ \text{Carbonate carbonyl content of} \\ \text{carbonate-resorcinol-carbonate} \\ \text{sequences} \end{bmatrix}} * (100).$$

10. The polycarbonate copolymer of claim 1, wherein the stabilizer is a mineral acid or an organic acid, wherein the organic acid stabilizer is a $C_{1-12}$ carboxylic acid, or a $C_{2-12}$ carboxylic acid, or a $C_{-12}$ carboxylic acid, or a carboxylic acid derivative of any of the foregoing.

11. The polycarbonate copolymer of claim 10, wherein the organic acid stabilizer is a hydroxy-substituted carboxylic acid, a lactone, a hydroxy-substituted lactone, a polycarboxylic acid, a hydroxy-substituted polycarboxylic acid, or a combination comprising at least one of the foregoing.

12. The polycarbonate copolymer of claim 11, wherein the stabilizer is oxalic acid, malic acid, citric acid, ascorbic acid, 2,3,4,5,6-pentahydroxyhexanoic acid, 2,3,4,5-tetrahydroxypentaanoic acid, gluconic acid, maleic acid, fumaric acid, HCl, phosphoric acid, phosphorous acid, lactic acid, formic acid, tartaric acid, tartronic acid, the corresponding lactone or $C_{1-6}$ alkyl ester of any of the foregoing, or a combination comprising at least one of the foregoing.

13. The polycarbonate copolymer of claim 11, wherein the stabilizer is gluconic acid.

14. The polycarbonate copolymer of claim 8, wherein the stabilizer comprises gluconic acid, and a molded sample of the polycarbonate copolymer powder has a yellowness index of less than 13 as measured by ASTM D1925 on a 3.2 mm thick plaque.

15. The polycarbonate copolymer of claim 1 comprising, based on the total weight of the polycarbonate copolymer, 1 to 10.3 weight percent bisphenol A carbonate units;

2.5 to 13 weight percent of resorcinol carbonate units;

0.25 to 2.5 weight percent of siloxane units of the formulas

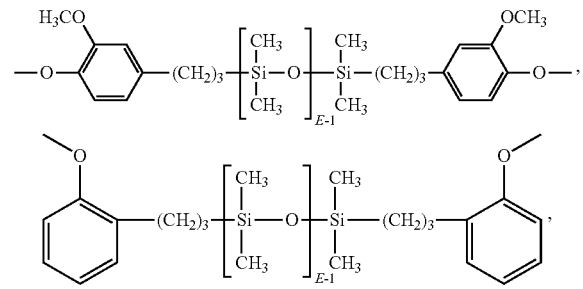

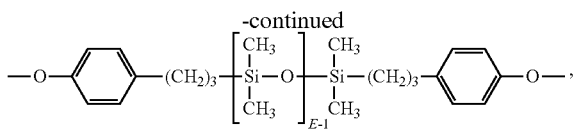

or a combination comprising at least one of the foregoing, wherein E has an average value of 5 to 15; the siloxane content being 0.6 to 1.5 wt. %, based on the total weight of the polycarbonate copolymer; and 75 to 91 weight percent of resorcinol isophthalate/terephthalate ester units derived from a resorcinol composition having a hydroquinone content of 60 to 200 parts per million, a catechol content of 10 to 30 parts per million, and a phenol content of 800 to 2400, each as determined by high performance liquid chromatography, and a $C_{4-12}$ hydroxy-substituted carboxylic acid stabilizer.

16. A thermoplastic composition comprising the polycarbonate copolymer of claim 1.

17. An article comprising the thermoplastic composition of claim 16, wherein the article is a molded article, a fiber, a thermoformed article, an extruded film, an extruded sheet, one or more layers of a multi-layer article, a substrate for a coated article, or a substrate for a metallized article.

18. The article of claim 17, wherein the article is a housing for a computer, business machine, or handheld electronic device, an electrical connectors, a component of lighting fixtures, ornaments, home appliances, roofs, greenhouses, sun rooms, swimming pool enclosures, a weatherable opaque part, a tractor hood, a tractor side panel, an automotive grill or other automotive part, or a transportation component.

19. An article comprising the thermoplastic composition of claim 16, wherein the article is a transportation component, preferably ceiling paneling, flaps, boxes, hoods, louvers, insulation material in an interior body shells in interiors, side walls, front walls, end walls, partitions, room dividers, interior doors, interior lining of doors, luggage overhead luggage racks, vertical luggage racks, luggage containers, luggage compartments, windows, window frames, kitchen interior component, access panels, access doors, air flow regulators, baggage storage doors, display panels, display units, door handles, door pulls, enclosures for electronic devices, food carts, food trays, grilles, handles, magazine racks, seat components, refrigerator doors, seat backs, side walls, tray tables, or trim panels.

20. A method of manufacturing the polycarbonate copolymer of claim 1, the method comprising reacting a combination comprising a dicarboxylic acid dihalide, optionally a dihydroxy siloxane, and a resorcinol composition having a hydroquinone content of 5 to 1200 parts per million, a catechol content of 5 to 29 parts per million, a phenol content of 0 to 2400, each as determined by high performance liquid chromatography, and further comprising an organic stabilizer having at least a first pKa from 2.5 to 4.5, to provide an arylate-resorcinol-arylate polymer; and reacting the arylate-resorcinol-arylate polymer with a bisphenol and a carbonate precursor preferably at a pH of less than 11 to provide the polycarbonate copolymer.

21. A polycarbonate copolymer formed by the method of claim 20, wherein the polycarbonate copolymer is a poly (carbonate-siloxane-arylate) having a molar ratio of carbonate carbonyl groups relative to ester carbonyl groups of 0.13:1 to 0.20:1 as determined by Fourier transform infrared spectroscopy; and a percent ester carbonyl content of 91 to 84 mol% as determined by $^{13}C$ nuclear magnetic resonance spectroscopy using the equation:

$$\text{Percent ester carbonyl content} = \frac{\left[\begin{array}{c}\text{Ester carbonyl content of}\\ \text{arylate-resorcinol-arylate +}\\ \text{sequences}\end{array}\right] - \left(\begin{array}{c}\text{Ester carbonyl content of}\\ 0.5 * \text{arylate-resorcinol-carbonate}\\ \text{sequences}\end{array}\right)}{\left[\begin{array}{c}\text{Ester carbonyl content of}\\ \text{arylate-resorcinol-arylate +}\\ \text{sequences}\\ \text{Ester carbonyl content of}\\ \text{arylate-resorcinol-carbonate +}\\ \text{sequences}\\ \text{Carbonate carbonyl content of}\\ \text{carbonate-resorcinol-carbonate}\\ \text{sequences}\end{array}\right]} * (100).$$

\* \* \* \* \*